United States Patent
Huang et al.

(10) Patent No.: US 11,160,095 B2
(45) Date of Patent: Oct. 26, 2021

(54) BASIC SERVICE SET INFORMATION SPREADING INDICATION

(71) Applicant: Intel Corporation, Santa Clara, CA (US)

(72) Inventors: Po-Kai Huang, San Jose, CA (US); Danny Ben-Ari, Tsur Natan (IL); Johannes Berg, Detmold (DE); Laurent Cariou, Portland, OR (US); Avner Epstein, Givatayim (IL); Arik Klein, Givaat Shmuel (IL); Ido Ouzieli, Tel Aviv (IL); Robert Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 102 days.

(21) Appl. No.: 16/441,609

(22) Filed: Jun. 14, 2019

(65) Prior Publication Data
US 2019/0297632 A1    Sep. 26, 2019

Related U.S. Application Data

(60) Provisional application No. 62/684,955, filed on Jun. 14, 2018.

(51) Int. Cl.
*H04W 72/12* (2009.01)
*H04W 88/08* (2009.01)
(Continued)

(52) U.S. Cl.
CPC ........... *H04W 72/12* (2013.01); *H04L 5/0007* (2013.01); *H04L 61/3075* (2013.01);
(Continued)

(58) Field of Classification Search
CPC ..... H04W 72/12; H04W 36/06; H04W 48/10; H04W 72/0446; H04W 72/0433; H04L 29/12735; H04L 61/3075
See application file for complete search history.

(56) References Cited

U.S. PATENT DOCUMENTS

2018/0098378 A1*  4/2018  Patil ...................... H04W 88/10
2018/0199271 A1*  7/2018  Viger .................... H04W 48/12
(Continued)

OTHER PUBLICATIONS

Surroca et al, "Addressing the eduroam inter-domain mobility problem through virtual APs", IEEE, 2017 (Year: 2017).*

*Primary Examiner* — Omer S Mian
(74) *Attorney, Agent, or Firm* — Eversheds Sutherland (US) LLP

(57) ABSTRACT

This disclosure describes systems, methods, and devices related to basic service set (BSS) information spreading indication. A device may determine one or more collocated access points (APs). The device may determine a target beacon transmission time (TBTT) associated with a beacon interval. The device may determine a first beacon frame comprising a first multiple basic service set identification (BSSID) element. The device may determine a second beacon frame comprising a second multiple BSSID element. The device may determine a time period associated with the first beacon frame and the second beacon frame. The device may cause to send the first beacon frame at a first time to one or more station devices. The device may cause to send the second beacon frame at a second time to the one or more station devices.

12 Claims, 15 Drawing Sheets

(51) Int. Cl.
  *H04L 5/00* (2006.01)
  *H04W 72/04* (2009.01)
  *H04W 84/12* (2009.01)
  *H04L 29/12* (2006.01)

(52) U.S. Cl.
  CPC ....... *H04W 72/0446* (2013.01); *H04W 84/12* (2013.01); *H04W 88/08* (2013.01)

(56) References Cited

U.S. PATENT DOCUMENTS

2018/0302923 A1* 10/2018 Patil .................. H04W 76/11
2019/0268825 A1*  8/2019 Patil .................. H04W 48/12

* cited by examiner

| Subelement ID | Name | Extensible |
|---|---|---|
| 0 | Nontransmitted BSSID Profile | |
| 1-220 | Reserved | |
| 221 | Vendor Specific | |
| 222-255 | Reserved | |

| Element ID | Length | BSSID | BSSID Information | Operating Class | Channel Number | PHY Type | Optional Subelements |
|---|---|---|---|---|---|---|---|
| 1 | 1 | 6 | 4 | 1 | 1 | 1 | variable |

Octets:

FIG. 2D

BASIC SERVICE SET INFORMATION SPREADING INDICATION

CROSS-REFERENCE TO RELATED APPLICATION(S)

This application claims the benefit of U.S. Provisional Application No. 62/684,955, filed Jun. 14, 2018, the disclosure of which is incorporated herein by reference as if set forth in full.

TECHNICAL FIELD

This disclosure generally relates to systems and methods for wireless communications and, more particularly, to basic service set (BSS) information spreading indication.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

BRIEF DESCRIPTION OF THE DRAWINGS

FIGS. 2A-2D depict illustrative schematic diagrams for BSS information spreading indication, in accordance with one or more example embodiments of the present disclosure.

DETAILED DESCRIPTION

Figure 1:
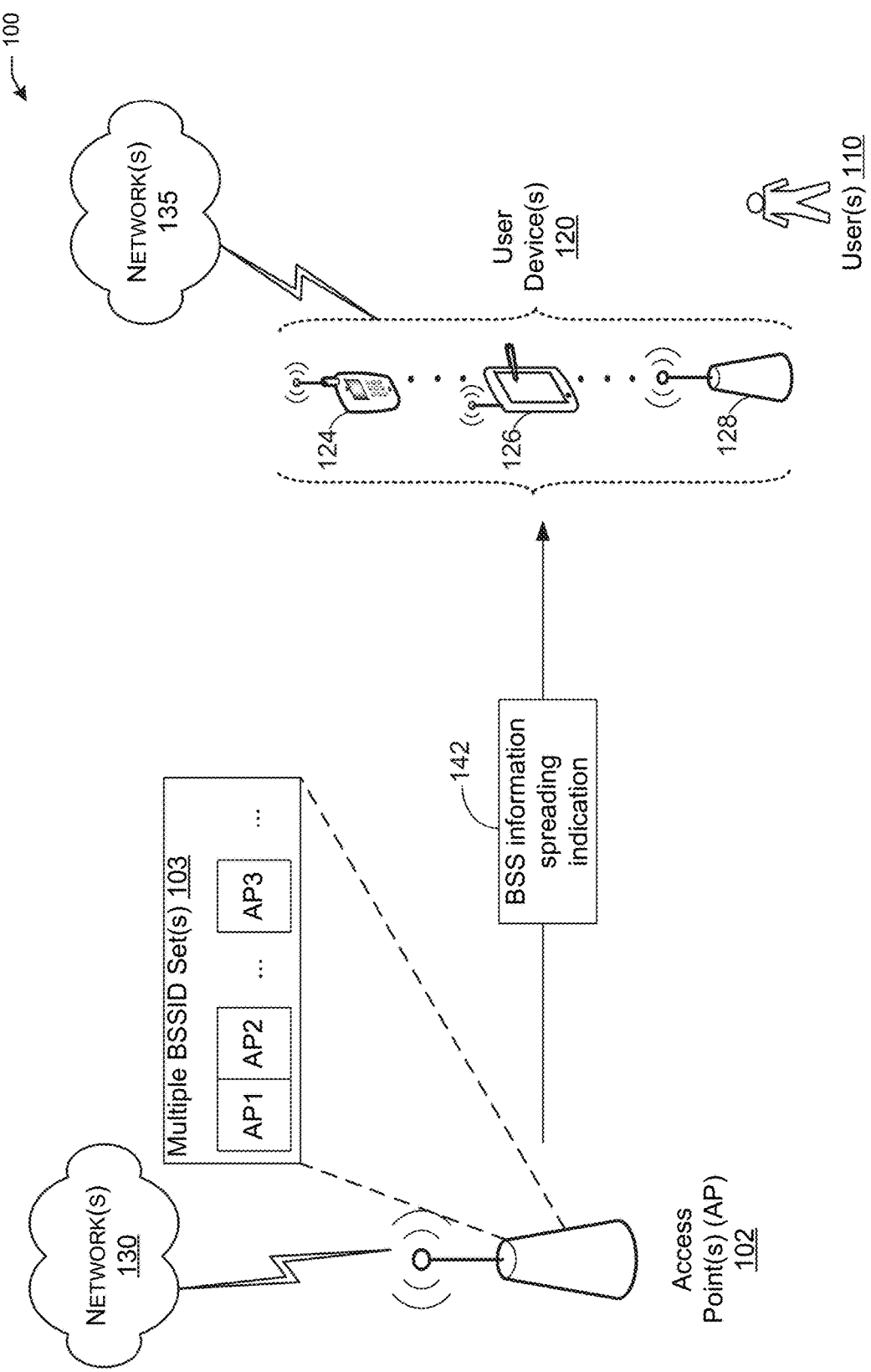
FIG. 1 is a network diagram illustrating an example network environment for BSS information spreading indication, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

The Multiple BSSID capability in the 802.11 amendment allows a single physical access point (AP) device to efficiently manage multiple groups of STAs by using different collocated APs (each with a different BSSID) to handle specific groups of STAs. For example, an AP may comprise one or more BSSIDs that may be used to create one or more networks (e.g., a guest network, a home network, a private network, etc.). Further, an AP may have a multiple BSSID set that is formed of multiple collocated APs, where each collocated AP is associated with a BSSID in the BSSID set. Moreover, for medium efficiency, the 802.11ax amendment allows STAs associated to different BSSIDs to receive Control frames sent with a transmitting station address (TA) address matching the transmitted BSSID. The "transmitted BSSID" is the BSSID of the collocated AP that transmits the beacon frames. A "non-transmitted BSSID" is the BSSID of a collocated AP in the BSSID set that is not a transmitted BSSID and that is not responsible for sending beacon frames on the single physical AP.

Due to the size limit of Beacon frame or probe response frame (2304 bytes for non-high throughput (HT) physical layer (PHY) protocol data unit (PPDU)), a transmitted BSSID AP may not be able to include all the nontransmitted BSSID profiles for BSSID belonging to a multiple BSSID set in one Beacon frame or probe response frame. Currently, the specification allows AP to use any criteria to include any number of nontransmitted BSSID profiles for basic service sets (BSSs) in a multiple BSSID set. This creates problem for a non-AP station device (STA) to know when it can find the nontransmitted BSSID profile for its associated BSS in a Beacon frame. This issue exists for probe response as well. Currently, the specification allows AP to use any criteria to include any number of nontransmitted BSSID profiles for BSSs in a probe response. As a result, STA has no idea if the received probe response frame includes all the information.

Similarly due to the size limit of management frame (2304 bytes for non-HT PPDU and 11454 bytes for very high throughput (VHT) PPDU or high efficiency (HE) PPDU), a AP may not be able to include all the neighbor report elements for all neighbor APs in 6 GHz.

Note that the problem described above is a general problem. When an AP tries to use any element to report information of other APs in one management frame transmission, due to size limit, the AP may not be able to include information of all APs that the AP intends to report in one management frame.

There may be a way for the AP to advertise the number of BSSs in a multiple BSSID element when AP cannot include all the nontransmitted BSSID profiles in a Beacon frame or probe response frame. The indication does not help the STA because during scan, STA can use the information to understand that current Beacon is partial, but does not know when it will get the missing information. Specifically, the STA does not know how to get the transmitted BSSID profile of its associated BSS if the transmitted BSSID profile is not included in the Beacon frame.

Example embodiments of the present disclosure relate to systems, methods, and devices for BSS information spreading indication.

A BSS information spreading indication system may facilitate that for multiple BSSID and neighbor report concept, one or more solutions below may be presented to resolve the problem of including incomplete information in a management frame due to size limit.

In one or more embodiments, a BSS information spreading indication system may facilitate that a transmitted BSSID AP can indicate the number of beacon intervals such that the beacons with target beacon transmission time (TBTT) inside the time period determined by any starting time and the number of beacon intervals will include all the nontransmitted BSSID profiles. Specifically, each nontransmitted BSSID profile will be included in at least one Beacon frame with TBTT inside the time period determined by any starting time and the number of beacon intervals. In some embodiments, the number of beacon intervals can determine the pattern of including each nontransmitted BSSID profile in the following approach: if a Beacon with TBTTx includes a nontransmitted BSSID profile, then the nontransmitted BSSID profile will be included in a Beacon frame with TBTTy, where y equals to x plus n*(the indicated number of beacon intervals), and n is an integer.

In one or more embodiments, a BSS information spreading indication system may facilitate that a transmitted BSSID AP can indicate the number of beacon intervals such that the beacons with target beacon transmission time (TBTT) inside the time period determined by any starting time and the number of beacon intervals will include all the neighbor reports. Specifically, each neighbor report will be included in at least one Beacon frame with TBTT resides inside the time period determined by any starting time and the number of beacon intervals. In some embodiments, the number of beacon intervals can determine the pattern of including each nontransmitted BSSID profiles in the following approach: if a Beacon with TBTT x includes a nontransmitted BSSID profile, then the nontransmitted BSSID profile will be included in a Beacon frame with TBTTy, where y equals to x plus n*(the indicated number of beacon intervals), and n is an integer.

In one or more embodiments, for probe response, a BSS information spreading indication system may facilitate the following options:

1. The AP can indicate in the probe response frame that another probe response is coming with nontransmitted BSSID profiles or neighbor reports that are not included in the probe response with the indication.

2. Design a probe suppression BSSID element with a list of BSSIDs for which the STA includes in the transmitting probe request to another STA, and another STA responds with probe response that may not contain related BSS information for BSS indicated in the list of BSSIDs. The BSS information can be either nontransmitted BSSID profiles or neighbor report. For example, a non-AP STA may send a directed probe request frame containing a known BSSID element to an AP that advertises partial list of nontransmitted BSSID profiles to gather information on nontransmitted BSSIDs it has not discovered. The AP, when transmitting a probe response frame in response to a probe request frame containing known BSSID element, may not include the nontransmitted BSSID profiles for BSSIDs listed in the known BSSID element and, at a minimum, may include the nontransmitted BSSID profiles requested by the soliciting probe request frame.

In one or more embodiments, the AP can spread out the indication of information like nontransmitted BSSID profiles and neighbor reports over several management frames to resolve the issue that all information cannot be included in one management frame due to size limit. Further, STA will know AP's pattern of spreading out information and it is in a better situation to find out the information that it is looking for.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment of BSS information spreading indication, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 5:
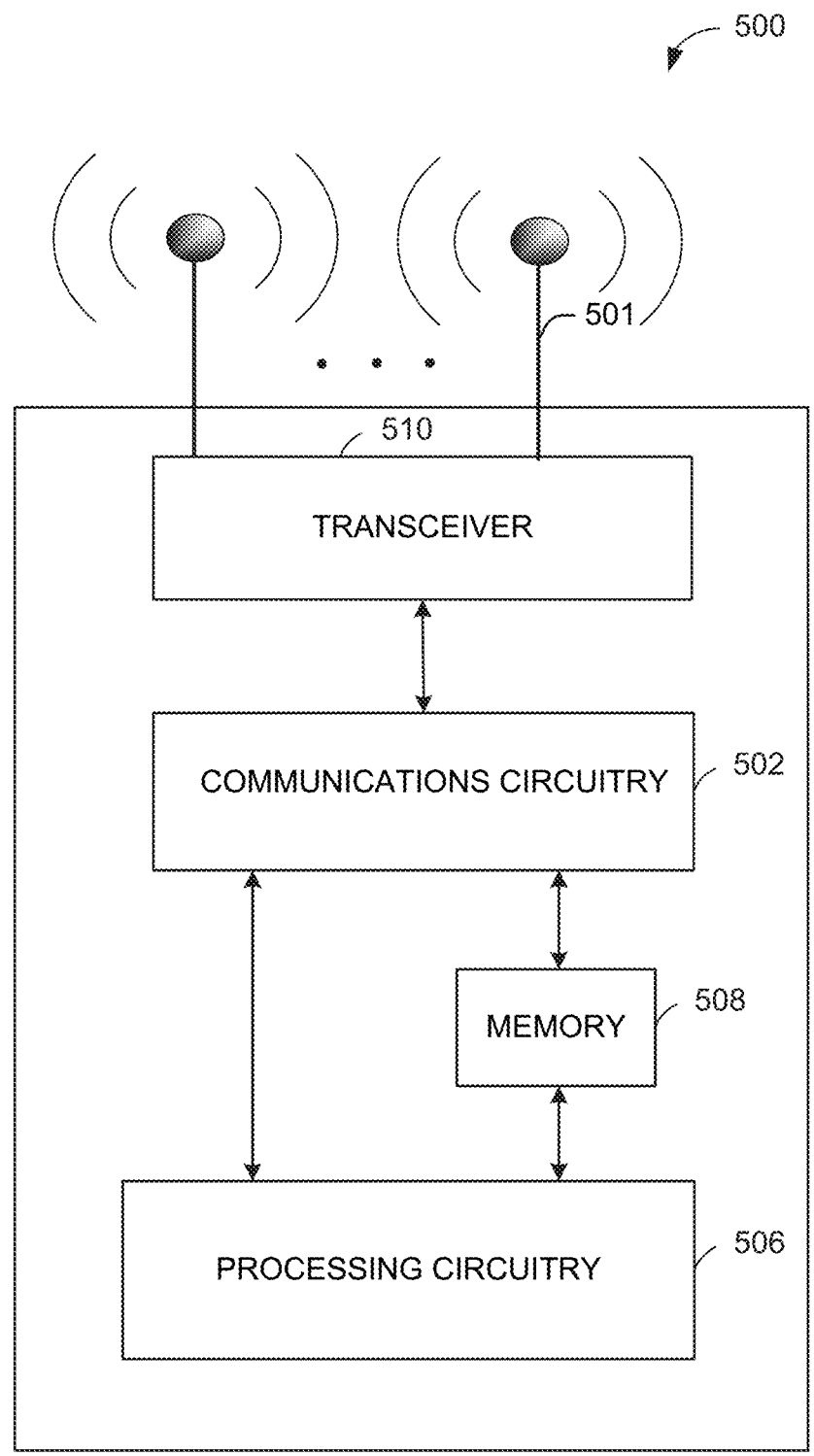
FIG. 5 illustrates a functional diagram of an exemplary communication station that may be suitable for use as a user device, in accordance with one or more example embodiments of the present disclosure.
Figure 6:
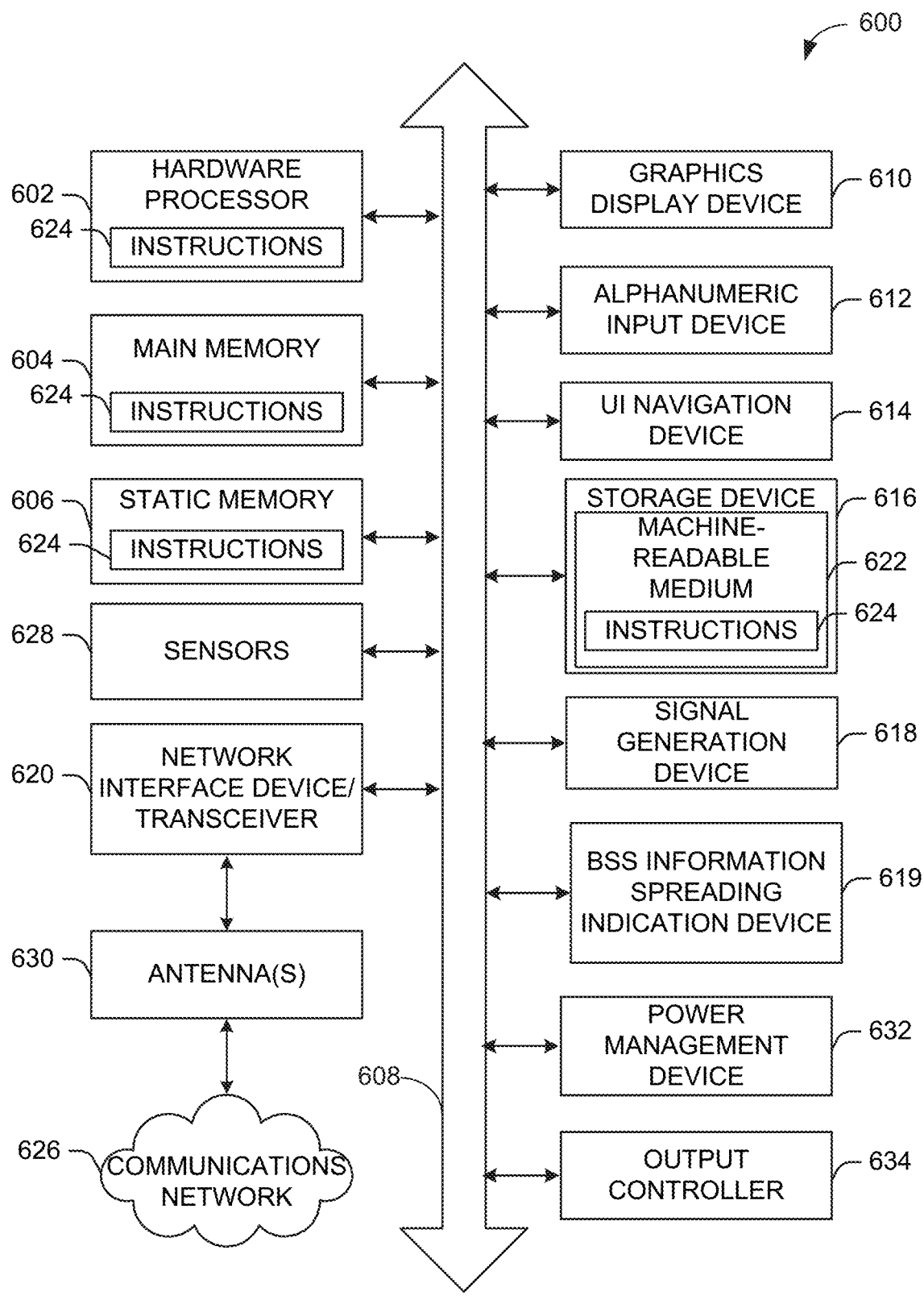
FIG. 6 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 5 and/or the example machine/system of FIG. 6.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static, device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile Internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHZ channels (e.g., 802.11ad, 802.11ay). 800 MHz channels (e.g., 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, AP 102 may communicate with one or more user devices 120. The AP 102 may send BSS information spreading indication 142 to the one or more user devices 120. The AP 102 may comprise one or multiple BSSID sets 103, where each multiple BSSID set 103 may comprise one or more collocated APs (e.g., AP1, AP2, and AP3). In this case, the AP 102 may designate one of the collocated APs (e.g., AP1, AP2 or AP3) to be the transmitted BSSID AP, which makes that one AP to be responsible for sending the BSS information spreading indication 142.

It is understood that the above descriptions are for purposes of illustration and are not meant to be limiting.

FIGS. 2A-2D depict illustrative schematic diagrams for BSS information spreading indication, in accordance with one or more example embodiments of the present disclosure.

Multiple BSSID is a concept to reduce beacon transmission and probe responses transmission for multiple BSSs. The idea is that multiple BSSs can form a multiple BSSID set, and among the BSSs in the multiple BSSID set, one of the BSS will be the BSS with transmitted BSSID, and the transmitted BSSID BSS can transmit one Beacon or one probe response with information of all the BSSs in the multiple BSSID set. All the BSSs in the multiple BSSID set that are not transmitted BSSID BSS are the nontransmitted BSSID BSSs.

The way to convey information in the multiple BSSID set is by using a multiple BSSID element (e.g., an information element (IE)).

Figure 2A:
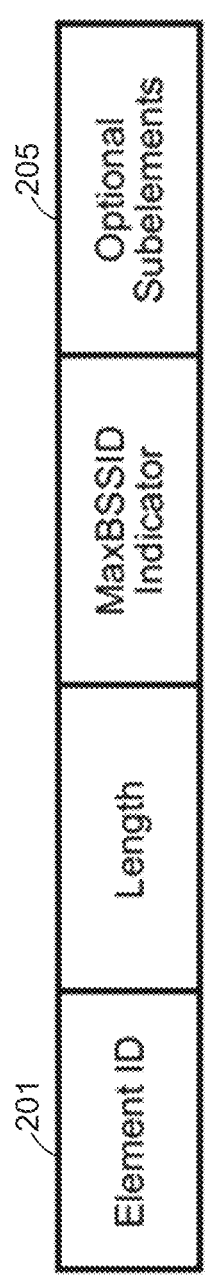
Figure 2B:
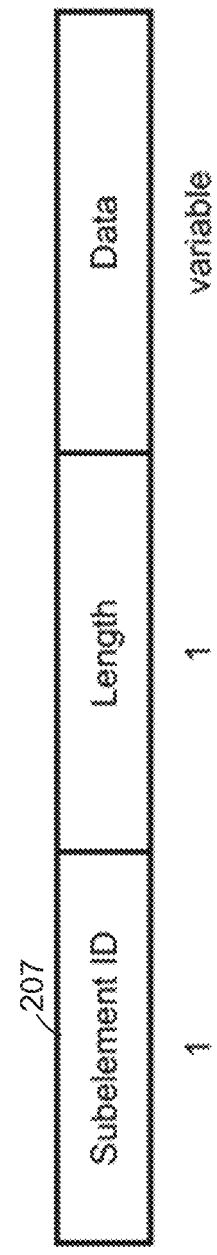

The format of multiple BSSID element is shown in FIGS. 2A-2C. For example, FIG. 2A shows the multiple BSSID element that comprises an element ID 201, a length field, a MaxBSSID indicator field, one or more optional subelements 205 field. Referring to FIG. 2B, there is shown the content of a subelement 205 field, which may be a subelement ID 207 field, a length field, and a data field. Referring to FIG. 2C, there is shown various indices to indicate various information. For example, an index 209 shows that a subelement ID of "0" represents a nontransmitted BSSID profile.

There may be multiple nontransmitted BSSID profiles in the multiple BSSID element, and each nontransmitted BSSID profile contains information for a single nontransmitted BSSID BSS. However, the total information that may need to be included in the multiple BSSID element may be too large to fit in a management frame (e.g., a beacon frame).

Due to the size limit of a multiple BSSID element, more than one multiple BSSID elements may be included, and each of them contains different nontransmitted BSSID profiles.

Neighbor report is a mechanism for an AP to report neighboring APs. The neighbor report element currently can only be included in neighbor report response frame. There are proposals to include neighbor report elements in other management frame such that a 2.4/5 GHz AP can report information of 6 GHz AP to a STA to discover 6 GHz AP. The format of neighbor report element is shown in FIG. 2D. It is understood that the above descriptions are for purposes of illustration and are not meant to be limiting.

FIGS. 3A-3D depict illustrative schematic diagrams for BSS information spreading indication, in accordance with one or more example embodiments of the present disclosure.

In one or more embodiment, a BSS information spreading indication system may facilitate that a transmitted BSSID AP can indicate the number of beacon intervals such that the beacons with TBTT inside the time period determined by any starting time and the number of beacon intervals will include all the nontransmitted BSSID profiles. Specifically, each nontransmitted BSSID profile for a BSS in the multiple BSSID set will be included in at least one Beacon frame inside the time period determined by any starting time and the number of beacon intervals.

Figure 3A:
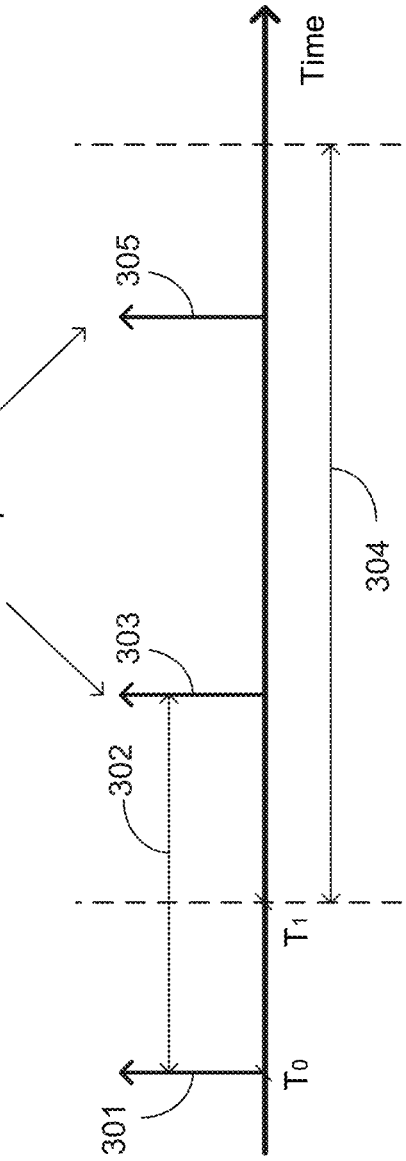
FIGS. 3A-3D depict illustrative schematic diagrams for BSS information spreading indication, in accordance with one or more example embodiments of the present disclosure.

Referring to FIG. 3A, there is shown a first example. In FIG. 3A, there is shown one or more beacon frames being sent by a transmitted BSSID and having a target beacon transmission time (TBTT) for each of these one or more beacon frames. For example, at time $T_0$, a beacon frame 301 may be sent and this may have a periodicity that at each period 302 another beacon frame is sent (e.g., beacon frames 303 and 305, and so on). Since there in this scenario, a multiple BSSID set that may comprise multiple BSSIDs, a transmitted BSSID would be responsible for sending the profiles of all the nontransmitted BSSIDs in the set to STAs.

In this first example:
  Each nontransmitted BSSID profile can have separate indication within a beacon frame sent by the transmitted BSSID. For example, if there are three nontransmitted BSSID profile, such that the size limitation within a first beacon frame of one or more beacon frames that have a TBTT does not permit the transmitted BSSID to send the nontransmitted BSSID profiles in only the first beacon frame, the transmitted BSSID may divide the nontransmitted BSSID profiles to be sent in a second beacon frame or additional beacon frames based on the number of nontransmitted BSSID profiles. Each beacon frame will comprise an indication of the nontransmitted BSSID profiles that are indicated in that beacon frame.
  The indication can be tied to the delivery traffic indication map (DTIM) period and can be indicated in the multiple BSSID-index element. Specifically, for the beacon frame with DTIM indication of a BSS, the nontransmitted BSSID profile of the BSS will be included within the beacon frame.

In this example, a transmitted BSSID AP can indicate a time period 304, which may include number of beacon intervals such that the beacon frames inside the time period 304 (e.g., beacon frames 303 and 305) would be enough to carry all the profiles of the multiple BSSID set. The time period 304 may be determined by a starting time Ti and the number of beacon intervals that will be needed in order to include all the nontransmitted BSSID profiles. Specifically, each nontransmitted BSSID profile for a BSS in the multiple BSSID set will be included in at least one beacon frame inside the time period 304 determined by a starting time Ti and the number of beacon intervals.

Figure 3B:
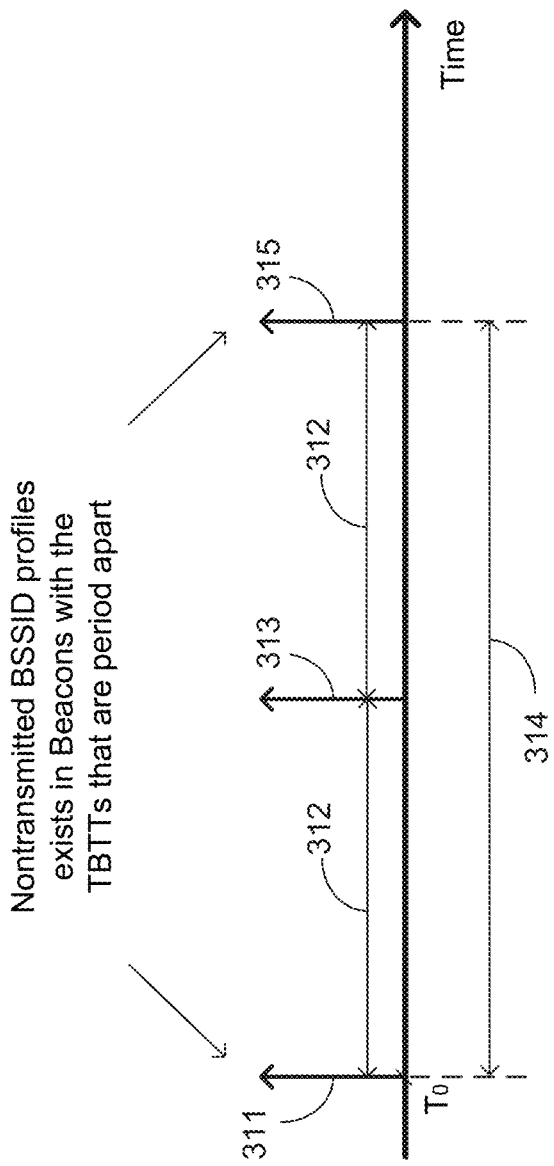

Referring to FIG. 3B, there is shown three beacon frames (e.g., beacon frames 311, 313, and 315) which are sent at a TBTT period 312. For example, at $T_0$, beacon frame 311 is sent, then beacon frame 313 is sent after TBTT period 312, and then beacon frame 315 is sent after TBTT period 312, and so on.

In one or more embodiments, the number of beacon intervals can determine the pattern of including each of the nontransmitted BSSID profiles according to the following approach: if a beacon with TBTTx include a nontransmitted BSSID profile, then this nontransmitted BSSID profile will be included in a Beacon frame with TBTTy, where y equals to x plus n*(the indicated number of beacon intervals), where n is an integer. In an example, assume there are three collocated APs, AP1, AP2, and AP3, where AP1 is the transmitted BSSID and the AP2 and the AP3 are the nontransmitted BSSIDs. In case a first beacon frame cannot include both profiles for AP3 and AP3 using the multiple BSSID element in the first beacon frame, the AP1 may determine to send each nontransmitted BSSID profile in a specific beacon frame at specific interval, where a time period 314 is determined by the number of indicated beacon intervals are needed in order to transmit all the nontransmitted BSSID profiles. For example, if n is equal to 2, then the nontransmitted BSSID profile of AP3 will be sent by the AP1 in a beacon frame at TBTT1+1×2, which is at TBTT3. That is, at the third period of TBTT, the AP1 will transmit the nontransmitted BSSID profile of the AP3, which may be received and decoded by the STA associated with the AP3. It should be understood that the transmitted BSSID (e.g., AP1) will determine the periodicity of where each profile is sent and will maintain that periodicity. However it should be understood that the transmitted BSSID may determine to alter that periodicity over time, for example, by changing the value of n.

In one or more embodiments, transmitted BSSID (e.g., AP1) may not change the pattern (e.g., focus n) unless the members in the multiple BSSID set change through addition or deletion. For example, if there are additional nontransmitted BSSID profiles to be sent by the transmitted BSSID in a beacon frame using the multiple BSSID element, the transmitted BSSID may determine to increase the value of the n such that the transmitted BSSID is capable of having enough size in the beacon frame to cover all the nontransmitted BSSID profiles.

In the example of FIG. 3B:

The indication can be in a new element as shown below.

| Element ID | Length | Element ID Extension | Number of beacon intervals for spreading nontransmitted BSSID profiles |
|---|---|---|---|

This new element may be carried when multiple BSSID element is carried.

This new element may be carried within nontransmitted BSSID profile of the multiple BSSID element to indicate different period for different nontransmitted BSSID profile.

The indication can be in a new subelement as shown below.

| Subelement ID | Length | Number of beacon intervals for spreading nontransmitted BSSID profiles |
|---|---|---|

The subelement may be carried within multiple BSSID element.

Figure 3C:
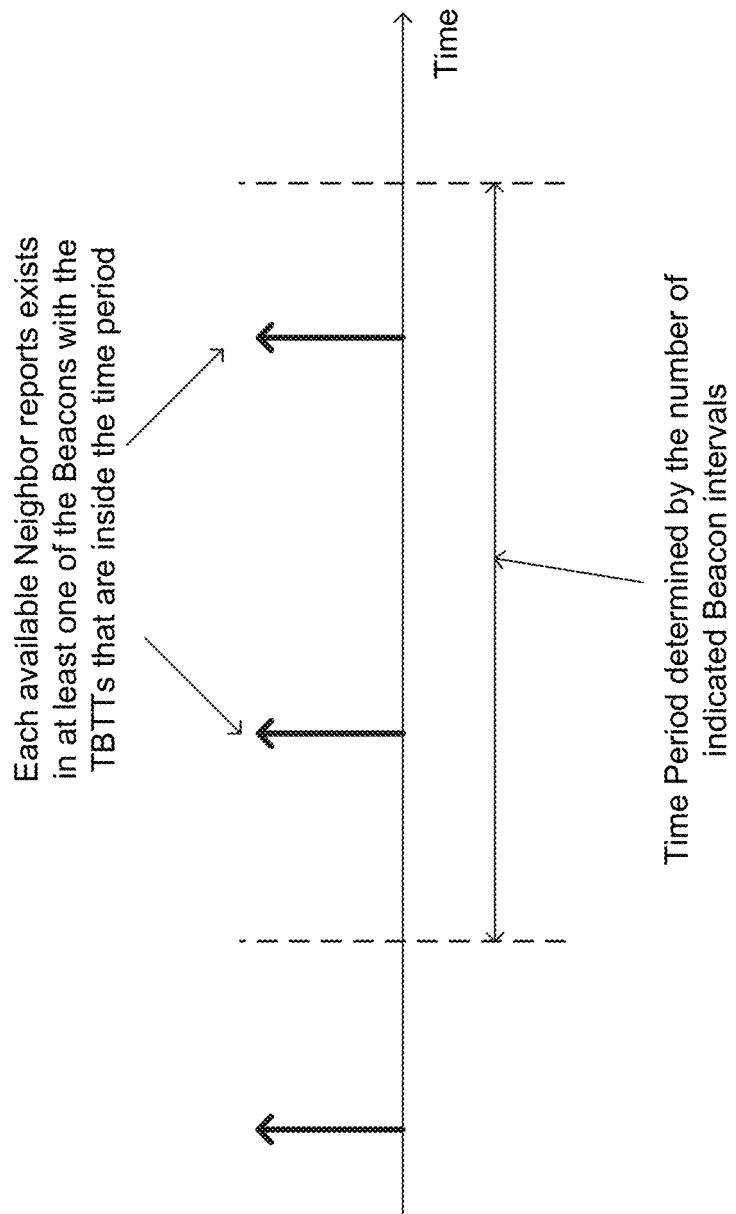
Figure 3D:
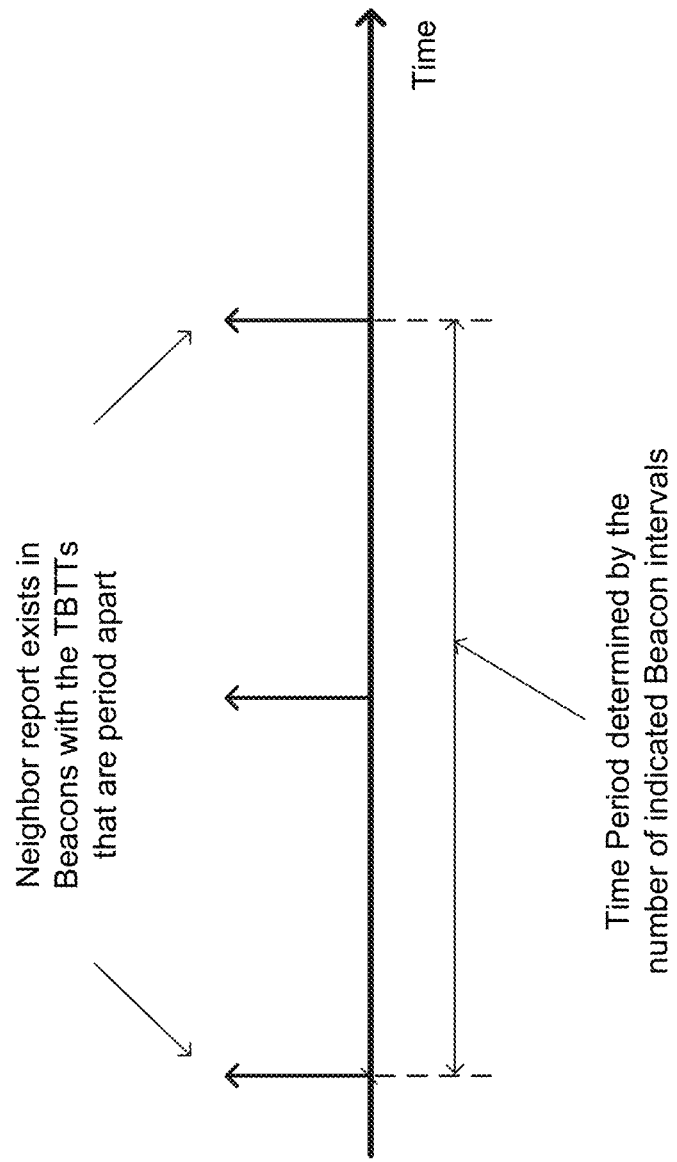

In one or more embodiments, a BSS information spreading indication system may facilitate that a transmitted BSSID AP can indicate the number of beacon intervals such that the beacons with TBTT inside the time period determined by any starting time and the number of beacon intervals will include all the neighbor reports. Specifically, each neighbor report of each of the BSSIDs within a multiple BSSID set will be included in at least one Beacon frame with TBTT inside the time period determined by any starting time and the number of beacon intervals. An example is shown in FIG. 3C. Each neighbor report can have separate indication.

In one or more embodiments, the number of beacon intervals can determine the pattern of including each of the neighbor reports according to the following approach: if a Beacon with TBTT x includes a neighbor report, then the neighbor report of the same AP will be included in a Beacon frame with TBTT y, where y equals to x plus n*(the indicated number of beacon intervals), where n is an integer. An example is shown FIG. 3D. AP may not change the pattern unless new neighbor report is added or existing neighbor report is removed.

In one or more embodiments, the indication can be in the reserved field of BSSID information in neighbor report. The indication can be in a new element as shown below.

| Element ID | Length | Element ID Extension | Number of beacon intervals for spreading neighbor report |
|---|---|---|---|

The element will be carried when neighbor report element is carried. The indication can be in a new subelement as shown below.

| Subelement ID | Length | Number of beacon intervals for spreading neighbor report |
|---|---|---|

The subelement will be carried within neighbor report element is carried.

In one or more embodiment, in the case of a probe response, a BSS information spreading indication system may facilitate the following options:

In one or more embodiments, a non-AP STA may send a directed probe request frame containing a known BSSID element to an AP that advertises partial list of nontransmitted BSSID profiles to gather information on nontransmitted BSSIDs it has not discovered. The AP, when transmitting a probe response frame in response to a probe request frame containing known BSSID element, may not include the nontransmitted BSSID profiles for BSSIDs listed in the known BSSID element and, at a minimum, may include the nontransmitted BSSID profiles requested by the soliciting probe request frame.

In one or more embodiments, the AP can indicate in the probe response that additional probe response is expected with further information of nontransmitted BSSID profiles that are not included in the probe response with the indication. The indication can be in a new element as shown below.

| Element ID | Length | Element ID Extension | Indicating a following probe response with further information of nontransmitted BSSID profiles |
|---|---|---|---|

The element will be carried when neighbor report element or multiple BSSID element is carried. The indication can be in a new subelement as shown below.

| Subelement ID | Length | Indicating a following probe response with further information of nontransmitted BSSID profiles |
|---|---|---|

The subelement will be carried within neighbor report element or multiple BSSID element.

In one or more embodiments, the AP can indicate in the probe response that additional probe response is expected with further information of neighbor reports that is not in the probe response with the indication. The indication can be in a new element as shown below.

| Element ID | Length | Element ID Extension | Indicating a following probe response with further information of neighbor reports |
|---|---|---|---|

The element will be carried when neighbor report element or multiple BSSID element is carried. The indication can be in a new subelement as shown below.

| Subelement ID | Length | Indicating a following probe response with further information of neighbor reports |
|---|---|---|

The subelement will be carried within neighbor report element or multiple BSSID element.

In one or more embodiments, AP can indicate in the probe response that additional probe response is expected with further information of nontransmitted BSSID profiles or neighbor reports that is not in the probe response with the indication. The indication can be in a new element as shown below.

| Element ID | Length | Element ID Extension | Indicating a following probe response with further information |
|---|---|---|---|

The element will be carried when neighbor report element or multiple BSSID element is carried. The indication can be in a new subelement as shown below.

| Subelement ID | Length | Indicating a following probe response with further information |
|---|---|---|

The subelement will be carried within neighbor report element or multiple BSSID element.

In one or more embodiment, a BSS information spreading indication system may design a Probe suppression BSSID element with a list of BSSIDs for which the STA includes in the transmitting probe request to another AP, and another AP responds with probe response that may not contain related BSS information for BSS indicated in the list of BSSIDs.

The BSS information can be nontransmitted BSSID profiles or neighbor report. The element may have the following format:

| Element ID | Length | Element ID Extension | Probe Suppression BSSIDs List |
|---|---|---|---|

In one or more embodiments, a capability is introduced for the AP to indicate if the AP supports processing the Probe suppression BSSID element. The capability bit can be in HE Capabilities element. The capability bit can be in Extended Capabilities element. STA may not send unicast probe request with Probe suppression BSSID element to the AP that does not indicate support of Probe suppression BSSID element. It is understood that the above descriptions are for purposes of illustration and are not meant to be limiting.

Figure 4:
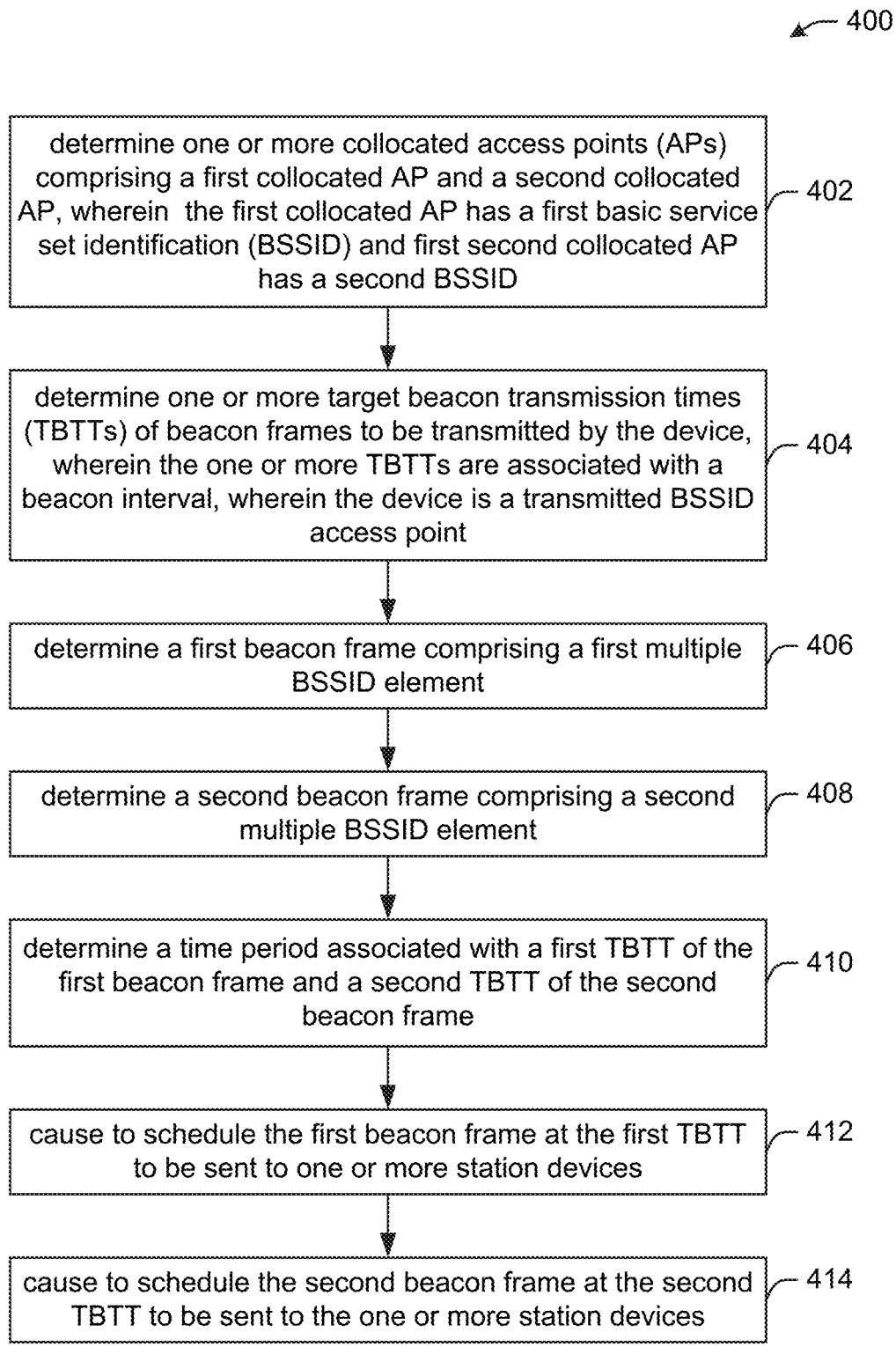
FIG. 4 illustrates a flow diagram of illustrative process for an illustrative BSS information spreading indication system, in accordance with one or more example embodiments of the present disclosure.

FIG. 4 illustrates a flow diagram of illustrative process 400 for an illustrative BSS information spreading indication system, in accordance with one or more example embodiments of the present disclosure.

At block 402, a device (e.g., the user device(s) 120 and/or the AP 102 of FIG. 1) may determine one or more collocated access points (APs) comprising a first collocated AP and a second collocated AP, wherein the first collocated AP has a first basic service set identification (BSSID) and first second collocated AP has a second BSSID.

At block 404, the device may determine one or more target beacon transmission times (TBTTs) of beacon frames to be transmitted by the device, wherein the one or more TBTTs are associated with a beacon interval, wherein the device is a transmitted BSSID access point. The first multiple BSSID element may comprise a first BSSID profile associated with the first collocated AP, and where the second multiple BSSID element may comprise a second BSSID profile associated with the second collocated AP.

At block 406, the device may determine a first beacon frame comprising a first multiple BSSID element.

At block 408, the device may determine a second beacon frame comprising a second multiple BSSID element.

At Block 410, the device may determine a time period associated with a first TBTT of the first beacon frame and a second TBTT of the second beacon frame. The time period may be associated with a number of indicated beacon intervals that are needed in order to transmit the first BSSID profile and the second BSSID profile. The first BSSID profile may be included in the first beacon frame and in a third beacon frame, where a difference of the first TBTT of the first beacon frame and the second TBTT of the third beacon frame may be based on an integer number associated with the time period. The device may determine the second BSSID profile may be included in a series of beacon frame having a series of target beacon transmission times (TBTT) where a difference of consecutive TBTTs is based on an integer number associated with the time period.

At block 412, the device may cause to schedule the first beacon frame at the first TBTT to be sent to one or more station devices. In some scenarios, the device may identify a probe request received from a first station device, where the probe request May comprise a first known BSSID element comprising an indication of first nontransmitted BSSID profiles known to the first station device. The device may cause to send a probe response that may comprise a second known BSSID element that includes second nontransmitted BSSID profiles, which are not indicated in the first known BSSID element. The probe response may not include the first nontransmitted BSSID profiles for BSSIDs listed in the first known BSSID of the probe request.

At block 414, the device may cause to schedule the second beacon frame at the second TBTT to be sent to the one or more station devices.

It is understood that the above descriptions are for purposes of illustration and are not meant to be limiting.

FIG. 5 shows a functional diagram of an exemplary communication station 500 in accordance with some embodiments. In one embodiment, FIG. 5 illustrates a functional block diagram of a communication station that may be suitable for use as an AP 102 (FIG. 1) or user device 120 (FIG. 1) in accordance with some embodiments. The communication station 500 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The transceiver 510 may be a device comprising both a transmitter and a receiver that are combined and share common circuitry (e.g., communication circuitry 502). The communication circuitry 502 may include amplifiers, filters, mixers, analog to digital and/or digital to analog converters. The transceiver 510 may transmit and receive analog or digital signals. The transceiver 510 may allow reception of signals during transmission periods. This mode is known as full-duplex, and may require the transmitter and receiver to operate on different frequencies to minimize interference between the transmitted signal and the received signal. The transceiver 510 may operate in a half-duplex mode, where the transceiver 510 may transmit or receive signals in one direction at a time.

The communications circuitry 502 may include circuitry that can operate the physical layer (PHY) communications and/or medium access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in detailed in FIGS. 1-4.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device memory.

FIG. 6 illustrates a block diagram of an example of a machine 600 or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), a BSS information spreading indication device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The BSS information spreading indication device 619 may carry out or perform any of the operations and processes (e.g., process 400) described and shown above.

It is understood that the above are only a subset of what the BSS information spreading indication device 619 may be configured to perform and that other functions included throughout this disclosure may also be performed by the BSS information spreading indication device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 7:
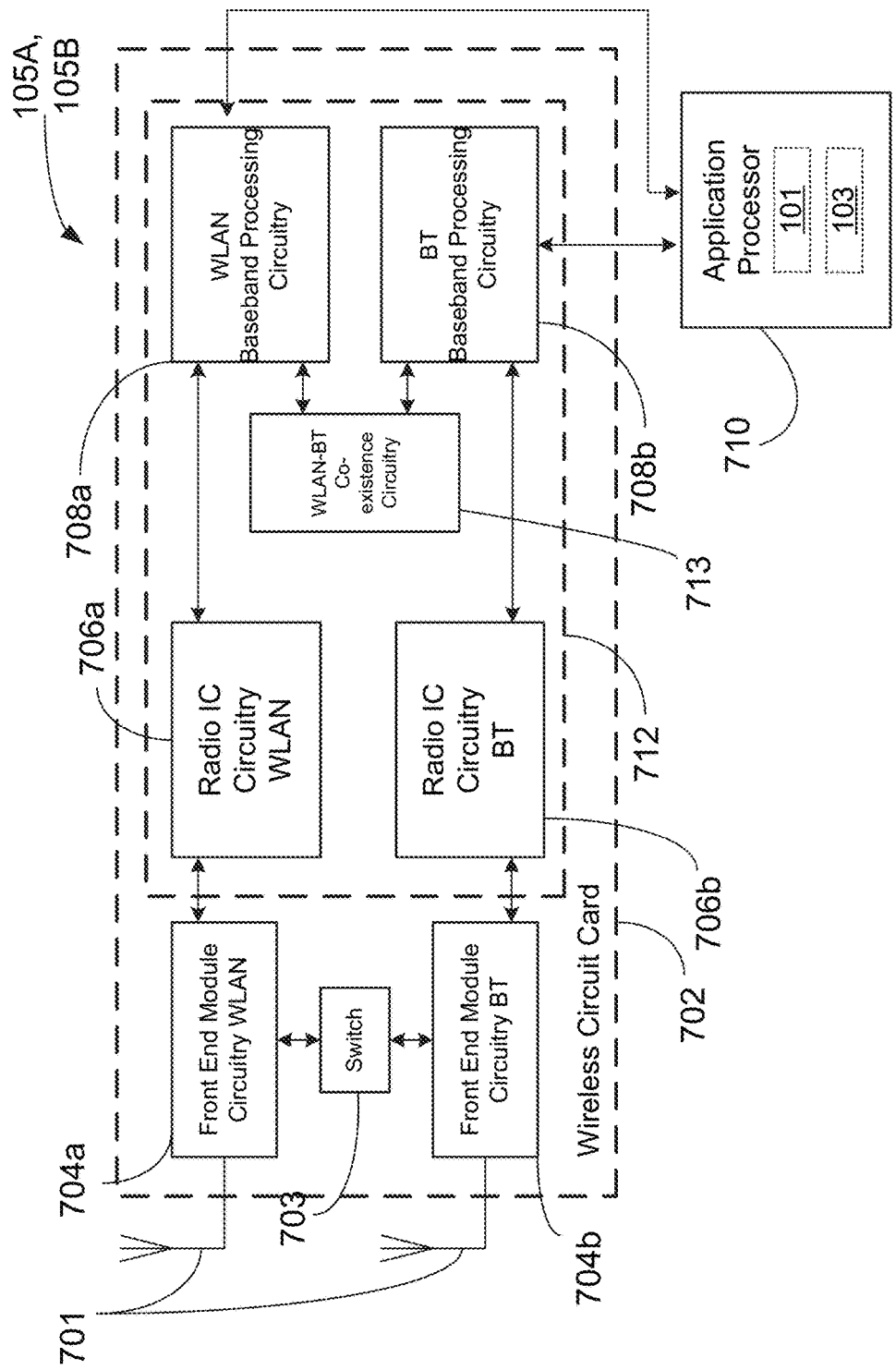
FIG. 7 is a block diagram of a radio architecture in accordance with some examples.

FIG. 7 is a block diagram of a radio architecture 105A, 105B in accordance with some embodiments that may be implemented in any one of the example AP 102 and/or the example user device 120 of FIG. 1. Radio architecture 105A, 105B may include radio front-end module (FEM) circuitry 704a-b, radio IC circuitry 706a-b and baseband processing circuitry 708a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 704a-b may include a WLAN or Wi-Fi FEM circuitry 704a and a Bluetooth (BT) FEM circuitry 704b. The WLAN FEM circuitry 704a may include a receive signal path comprising circuitry configured to operate on WLAN RF signals received from one or more antennas 701, to amplify the received signals and to provide the amplified versions of the received signals to the WLAN radio IC circuitry 706a for further processing. The BT FEM circuitry 704b may include a receive signal path which may include circuitry configured to operate on BT RF signals received from one or more antennas 701, to amplify the received signals and to provide the amplified versions of the received signals to the BT radio IC circuitry 706b for further processing. FEM circuitry 704a may also include a transmit signal path which may include circuitry configured to amplify WLAN signals provided by the radio IC circuitry 706a for wireless transmission by one or more of the antennas 701. In addition, FEM circuitry 704b may also include a transmit signal path which may include circuitry configured to amplify BT signals provided by the radio IC circuitry 706b for wireless transmission by the one or more antennas. In the embodiment of FIG. 7, although FEM 704a and FEM 704b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 706a-b as shown may include WLAN radio IC circuitry 706a and BT radio IC circuitry 706b. The WLAN radio IC circuitry 706a may include a receive signal path which may include circuitry to down-convert WLAN RF signals received from the FEM circuitry 704a and provide baseband signals to WLAN baseband processing circuitry 708a. BT radio IC circuitry 706b may in turn include a receive signal path which may include circuitry to down-convert BT RF signals received from the FEM circuitry 704b and provide baseband signals to BT baseband processing circuitry 708b. WLAN radio IC circuitry 706a may also include a transmit signal path which may include circuitry to up-convert WLAN baseband signals provided by the WLAN baseband processing circuitry 708a and provide WLAN RF output signals to the FEM circuitry 704a for subsequent wireless transmission by the one or more antennas 701. BT radio IC circuitry 706b may also include a transmit signal path which may include circuitry to up-convert BT baseband signals provided by the BT baseband processing circuitry 708b and provide BT RF output signals to the FEM circuitry 704b for subsequent wireless transmission by the one or more antennas 701. In the embodiment of FIG. 7, although radio IC circuitries 706a and 706b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 708a-b may include a WLAN baseband processing circuitry 708a and a BT baseband processing circuitry 708b. The WLAN baseband processing circuitry 708a may include a memory, such as, for example, a set of RAM arrays in a Fast Fourier Transform or Inverse Fast Fourier Transform block (not shown) of the WLAN baseband processing circuitry 708a. Each of the WLAN baseband circuitry 708a and the BT baseband circuitry 708b may further include one or more processors and control logic to process the signals received from the corresponding WLAN or BT receive signal path of the radio IC circuitry 706a-b, and to also generate corresponding WLAN or BT baseband signals for the transmit signal path of the radio IC circuitry 706a-b. Each of the baseband processing circuitries 708a and 708b may further include physical layer (PHY) and medium access control layer (MAC) circuitry, and may further interface with a device for generation and processing of the baseband signals and for controlling operations of the radio IC circuitry 706a-b.

Referring still to FIG. 7, according to the shown embodiment, WLAN-BT coexistence circuitry 713 may include logic providing an interface between the WLAN baseband circuitry 708a and the BT baseband circuitry 708b to enable use cases requiring WLAN and BT coexistence. In addition, a switch 703 may be provided between the WLAN FEM circuitry 704a and the BT FEM circuitry 704b to allow switching between the WLAN and BT radios according to application needs. In addition, although the antennas 701 are depicted as being respectively connected to the WLAN FEM circuitry 704a and the BT FEM circuitry 704b, embodiments include within their scope the sharing of one or more antennas as between the WLAN and BT FEMs, or the provision of more than one antenna connected to each of FEM 704a or 704b.

In some embodiments, the front-end module circuitry 704a-b, the radio IC circuitry 706a-b, and baseband processing circuitry 708a-b may be provided on a single radio card, such as wireless radio card 702. In some other embodiments, the one or more antennas 701, the FEM circuitry 704a-b and the radio IC circuitry 706a-b may be provided on a single radio card. In some other embodiments, the radio IC circuitry 706a-b and the baseband processing circuitry 708a-b may be provided on a single chip or integrated circuit (IC), such as IC 712.

In some embodiments, the wireless radio card 702 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 708b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 8:
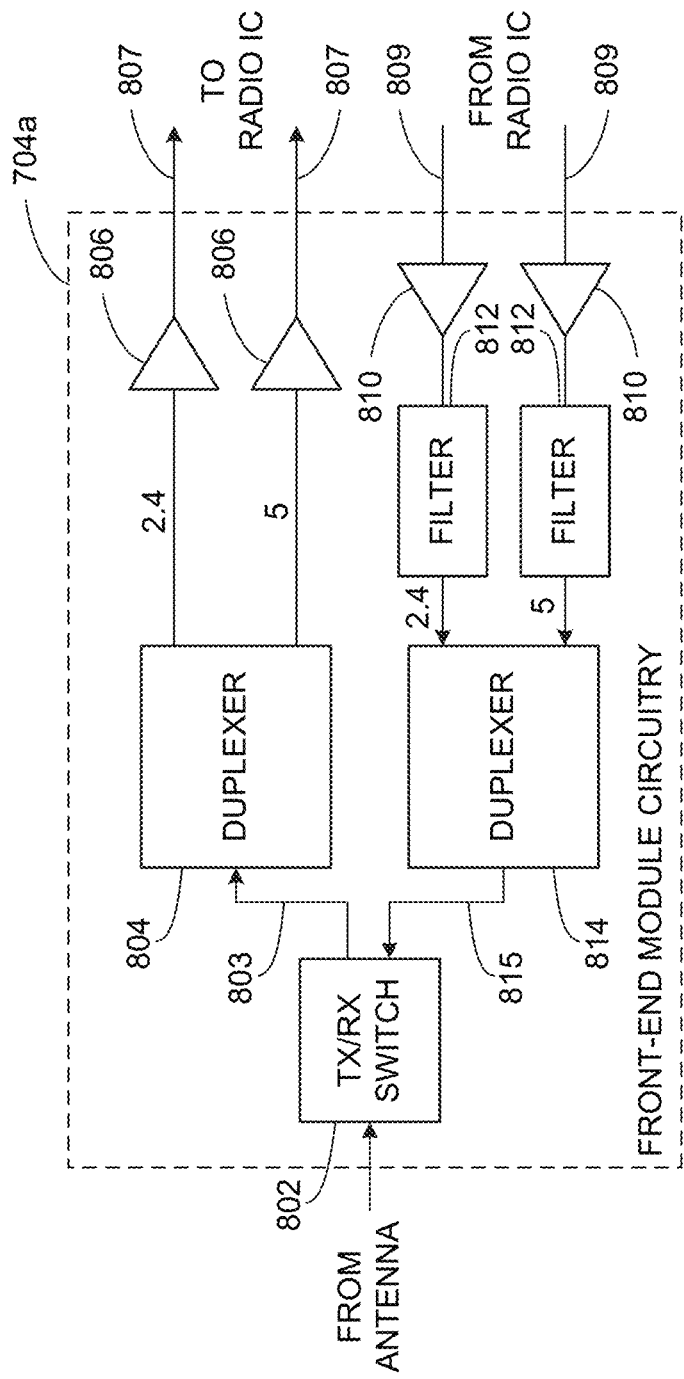
FIG. 8 illustrates an example front-end module circuitry for use in the radio architecture of FIG. 7, in accordance with one or more example embodiments of the present disclosure.

FIG. 8 illustrates WLAN FEM circuitry 704a in accordance with some embodiments. Although the example of FIG. 8 is described in conjunction with the WLAN FEM circuitry 704a, the example of FIG. 8 may be described in conjunction with the example BT FEM circuitry 704b (FIG. 7), although other circuitry configurations may also be suitable.

In some embodiments, the FEM circuitry 704a may include a TX/RX switch 802 to switch between transmit mode and receive mode operation. The FEM circuitry 704a may include a receive signal path and a transmit signal path. The receive signal path of the FEM circuitry 704a may include a low-noise amplifier (LNA) 806 to amplify received RF signals 803 and provide the amplified received RF signals 807 as an output (e.g., to the radio IC circuitry 706a-b (FIG. 7)). The transmit signal path of the circuitry 704a may include a power amplifier (PA) to amplify input RF signals 809 (e.g., provided by the radio IC circuitry 706a-b), and one or more filters 812, such as band-pass filters (BPFs), low-pass filters (LPFs) or other types of filters, to generate RF signals 815 for subsequent transmission (e.g., by one or more of the antennas 701 (FIG. 7)) via an example duplexer 814.

In some dual-mode embodiments for Wi-Fi communication, the FEM circuitry 704a may be configured to operate in either the 2.4 GHz frequency spectrum or the 5 GHz frequency spectrum. In these embodiments, the receive signal path of the FEM circuitry 704a may include a receive signal path duplexer 804 to separate the signals from each spectrum as well as provide a separate LNA 806 for each spectrum as shown. In these embodiments, the transmit signal path of the FEM circuitry 704a may also include a power amplifier 810 and a filter 812, such as a BPF, an LPF or another type of filter for each frequency spectrum and a transmit signal path duplexer 804 to provide the signals of one of the different spectrums onto a single transmit path for subsequent transmission by the one or more of the antennas 701 (FIG. 7). In some embodiments, BT communications may utilize the 2.4 GHz signal paths and may utilize the same FEM circuitry 704a as the one used for WLAN communications.

Figure 9:
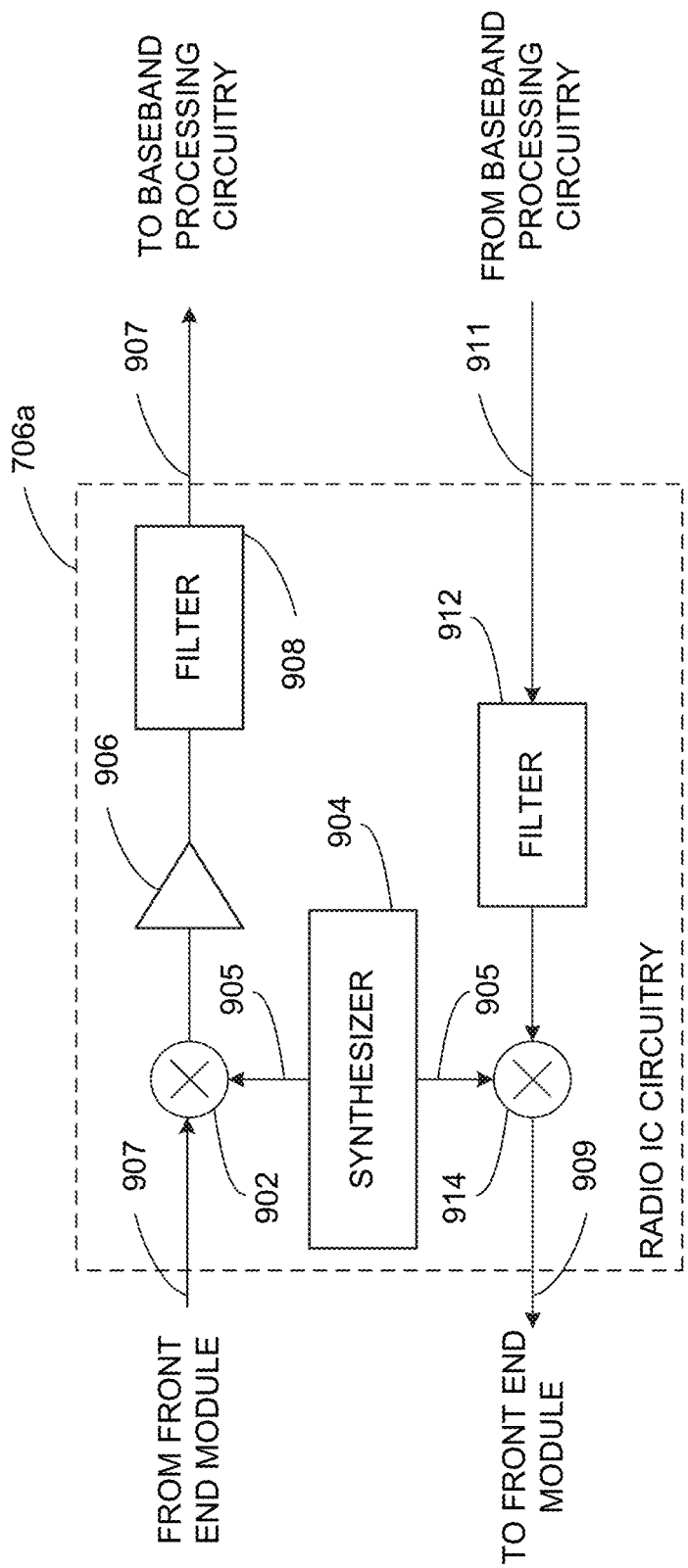
FIG. 9 illustrates an example radio IC circuitry for use in the radio architecture of FIG. 7, in accordance with one or more example embodiments of the present disclosure.

FIG. 9 illustrates radio IC circuitry 706a in accordance with some embodiments. The radio IC circuitry 706a is one example of circuitry that may be suitable for use as the WLAN or BT radio IC circuitry 706a/706b (FIG. 7), although other circuitry configurations may also be suitable. Alternatively, the example of FIG. 9 may be described in conjunction with the example BT radio IC circuitry 706b.

In some embodiments, the radio IC circuitry 706a may include a receive signal path and a transmit signal path. The receive signal path of the radio IC circuitry 706a may include at least mixer circuitry 902, such as, for example, down-conversion mixer circuitry, amplifier circuitry 906 and filter circuitry 908. The transmit signal path of the radio IC circuitry 706a may include at least filter circuitry 912 and mixer circuitry 914, such as, for example, up-conversion mixer circuitry. Radio IC circuitry 706a may also include synthesizer circuitry 904 for synthesizing a frequency 905 for use by the mixer circuitry 902 and the mixer circuitry 914. The mixer circuitry 902 and/or 914 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 9 illustrates only a simplified version of a radio IC circuitry, and may include, although not shown, embodiments where each of the depicted circuitries may include more than one component. For instance, mixer circuitry 914 may each include one or more mixers, and filter circuitries 908 and/or 912 may each include one or more filters, such as one or more BPFs and/or LPFs according to application needs. For example, when mixer circuitries are of the direct-conversion type, they may each include two or more mixers.

In some embodiments, mixer circuitry 902 may be configured to down-convert RF signals 807 received from the FEM circuitry 704a-b (FIG. 7) based on the synthesized frequency 905 provided by synthesizer circuitry 904. The amplifier circuitry 906 may be configured to amplify the down-converted signals and the filter circuitry 908 may include an LPF configured to remove unwanted signals from the down-converted signals to generate output baseband signals 907. Output baseband signals 907 may be provided to the baseband processing circuitry 708a-b (FIG. 7) for further processing. In some embodiments, the output baseband signals 907 may be zero-frequency baseband signals, although this is not a requirement. In some embodiments, mixer circuitry 902 may comprise passive mixers, although the scope of the embodiments is not limited in this respect.

In some embodiments, the mixer circuitry 914 may be configured to up-convert input baseband signals 911 based on the synthesized frequency 905 provided by the synthesizer circuitry 904 to generate RF output signals 809 for the FEM circuitry 704a-b. The baseband signals 911 may be provided by the baseband processing circuitry 708a-b and may be filtered by filter circuitry 912. The filter circuitry 912 may include an LPF or a BPF, although the scope of the embodiments is not limited in this respect.

In some embodiments, the mixer circuitry 902 and the mixer circuitry 914 may each include two or more mixers and may be arranged for quadrature down-conversion and/or up-conversion respectively with the help of synthesizer 904. In some embodiments, the mixer circuitry 902 and the mixer circuitry 914 may each include two or more mixers each configured for image rejection (e.g., Hartley image rejection). In some embodiments, the mixer circuitry 902 and the mixer circuitry 914 may be arranged for direct down-conversion and/or direct up-conversion, respectively. In some embodiments, the mixer circuitry 902 and the mixer circuitry 914 may be configured for super-heterodyne operation, although this is not a requirement.

Mixer circuitry 902 may comprise, according to one embodiment: quadrature passive mixers (e.g., for the in-phase (I) and quadrature phase (Q) paths). In such an embodiment, RF input signal 807 from FIG. 9 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency (fLO) from a local oscillator or a synthesizer, such as LO frequency 905 of synthesizer 904 (FIG. 9). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 807 (FIG. 8) may comprise a balanced signal, although the scope of the embodiments is not limited in this respect. The I and Q baseband output signals may be provided to low-noise amplifier, such as amplifier circuitry 906 (FIG. 9) or to filter circuitry 908 (FIG. 9).

In some embodiments, the output baseband signals 907 and the input baseband signals 911 may be analog baseband signals, although the scope of the embodiments is not limited in this respect. In some alternate embodiments, the output baseband signals 907 and the input baseband signals 911 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 904 may be a fractional-N synthesizer or a fractional N/N+1 synthesizer, although the scope of the embodiments is not limited in this respect as other types of frequency synthesizers may be suitable. For example, synthesizer circuitry 904 may be a delta-sigma synthesizer, a frequency multiplier, or a synthesizer comprising a phase-locked loop with a frequency divider. According to some embodiments, the synthesizer circuitry 904 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 904 may be provided by a voltage controlled oscillator (VCO), although that is not a requirement. A divider control input may further be provided by either the baseband processing circuitry 708a-b (FIG. 7) depending on the desired output frequency 905. In some embodiments, a divider control input (e.g., N) may be determined from a look-up table (e.g., within a Wi-Fi card) based on a channel number and a channel center frequency as determined or indicated by the example application processor 710. The application processor 710 may include, or otherwise be connected to, one of the example secure signal converter 101 or the example received signal converter 103 (e.g., depending on which device the example radio architecture is implemented in).

In some embodiments, synthesizer circuitry 904 may be configured to generate a carrier frequency as the output frequency 905, while in other embodiments, the output frequency 905 may be a fraction of the carrier frequency (e.g., one-half the carrier frequency, one-third the carrier frequency). In some embodiments, the output frequency 905 may be a LO frequency (fLO).

Figure 10:
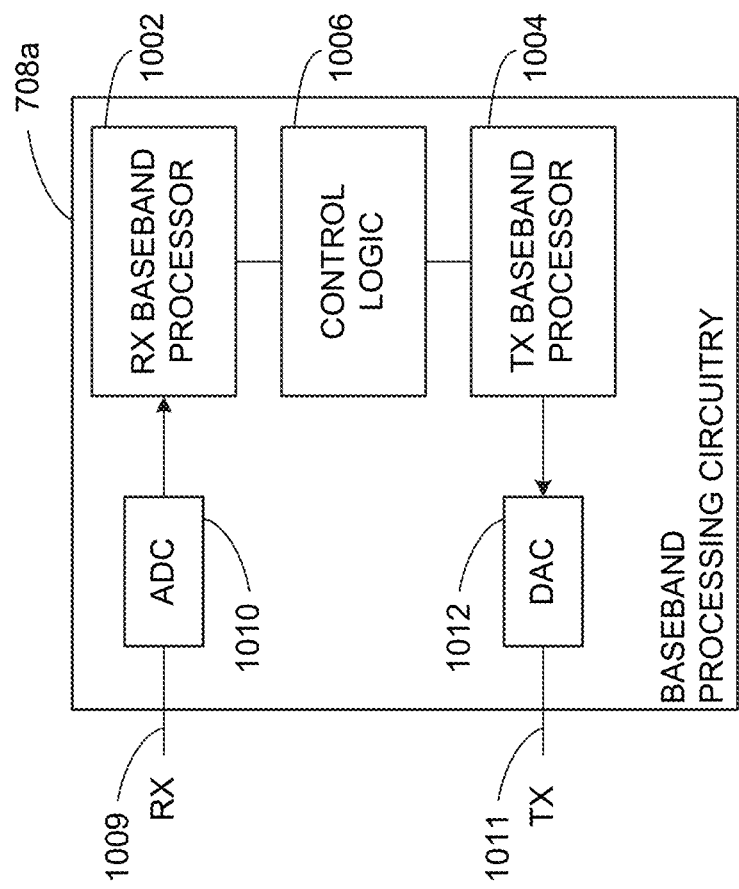
FIG. 10 illustrates an example baseband processing circuitry for use in the radio architecture of FIG. 7, in accordance with one or more example embodiments of the present disclosure.

FIG. 10 illustrates a functional block diagram of baseband processing circuitry 708a in accordance with some embodiments. The baseband processing circuitry 708a is one example of circuitry that may be suitable for use as the baseband processing circuitry 708a (FIG. 7), although other circuitry configurations may also be suitable. Alternatively, the example of FIG. 9 may be used to implement the example BT baseband processing circuitry 708b of FIG. 7.

The baseband processing circuitry 708a may include a receive baseband processor (RX BBP) 1002 for processing receive baseband signals 909 provided by the radio IC circuitry 706a-b (FIG. 7) and a transmit baseband processor (TX BBP) 1004 for generating transmit baseband signals 911 for the radio IC circuitry 706a-b. The baseband processing circuitry 708a may also include control logic 1006 for coordinating the operations of the baseband processing circuitry 708a.

In some embodiments (e.g., when analog baseband signals are exchanged between the baseband processing circuitry 708a-b and the radio IC circuitry 706a-b), the baseband processing circuitry 708a may include ADC 1010 to convert analog baseband signals 1009 received from the radio IC circuitry 706a-b to digital baseband signals for processing by the RX BBP 1002. In these embodiments, the baseband processing circuitry 708a may also include DAC 1012 to convert digital baseband signals from the TX BBP 1004 to analog baseband signals 1011.

In some embodiments that communicate OFDM signals or OFDMA signals, such as through baseband processor 708a, the transmit baseband processor 1004 may be configured to generate OFDM or OFDMA signals as appropriate for transmission by performing an inverse fast Fourier transform (IFFT). The receive baseband processor 1002 may be configured to process received OFDM signals or OFDMA signals by performing an FFT. In some embodiments, the receive baseband processor 1002 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 7, in some embodiments, the antennas 701 (FIG. 7) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 701 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: determine one or more collocated access points (APs) comprising a first collocated AP and a second collocated AP, wherein the first collocated AP has a first basic service set identification (BSSID) and first second collocated AP has a second BSSID; determine one or more target beacon transmission times (TBTTs) of beacon frames to be transmitted by the device, wherein the one or more TBTTs are associated with a beacon interval, wherein the device may be a transmitted BSSID access point; determine a first beacon frame comprising a first multiple BSSID element; determine a second beacon frame comprising a second multiple BSSID element; determine a time period associated with a first TBTT of the first beacon frame and a second TBTT of the second beacon frame; cause to schedule the first beacon frame at the first TBTT to be sent to one or more station devices; and cause to schedule the second beacon frame at the second TBTT to be sent to the one or more station devices.

Example 2 may include the device of example 1 and/or some other example herein, wherein the first multiple BSSID element comprises a first BSSID profile associated with the first collocated AP, and wherein the second multiple BSSID element comprises a second BSSID profile associated with the second collocated AP.

Example 3 may include the device of example 2 and/or some other example herein, wherein the time period may be associated with a number of indicated beacon intervals that are needed in order to transmit the first BSSID profile and the second BSSID profile.

Example 4 may include the device of example 2 and/or some other example herein, wherein the first BSSID profile may be included in the first beacon frame and in a third beacon frame, wherein a difference of the first TBTT of the first beacon frame and the second TBTT of the third beacon frame may be based on an integer number associated with the time period.

Example 5 may include the device of example 2 and/or some other example herein, wherein the processing circuitry may be further configured to determine the second BSSID profile may be included in a series of beacon frame having a series of target beacon transmission times (TBTT) wherein a difference of consecutive TBTTs may be based on an integer number associated with the time period.

Example 6 may include the device of example 1 and/or some other example herein, wherein the processing circuitry may be further configured to: identify a probe request received from a first station device, wherein the probe request comprises a first known BSSID element comprising an indication of first nontransmitted BSSID profiles known to the first station device; and cause to send a probe response comprising a second known BSSID element that may include second nontransmitted BSSID profiles, which are not indicated in the first known BSSID element.

Example 7 may include the device of example 6 and/or some other example herein, wherein the probe response does not include the first nontransmitted BSSID profiles for BSSIDs listed in the first known BSSID of the probe request.

Example 8 may include the device of example 1 and/or some other example herein, further comprising a transceiver configured to transmit and receive wireless signals.

Example 9 may include the device of example 8 and/or some other example herein, further comprising an antenna coupled to the transceiver to cause to send the first beacon frame.

Example 10 may include a non-transitory computer-readable medium storing computer-executable instructions which when executed by one or more processors result in performing operations comprising: determining one or more collocated access points (APs) comprising a first collocated AP and a second collocated AP, wherein the first collocated AP has a first basic service set identification (BSSID) and first second collocated AP has a second BSSID; determining one or more target beacon transmission times (TBTTs) of beacon frames to be transmitted by the device, wherein the one or more TBTTs are associated with a beacon interval, wherein the device may be a transmitted BSSID access point; determining a first beacon frame comprising a first multiple BSSID element; determining a second beacon frame comprising a second multiple BSSID element; determining a time period associated with a first TBTT of the first beacon frame and a second TBTT of the second beacon frame; causing to schedule the first beacon frame at the first TBTT to be sent to one or more station devices; and causing to schedule the second beacon frame at the second TBTT to be sent to the one or more station devices.

Example 11 may include the non-transitory computer-readable medium of example 10 and/or some other example herein, wherein the first multiple BSSID element comprises a first BSSID profile associated with the first collocated AP, and wherein the second multiple BSSID element comprises a second BSSID profile associated with the second collocated AP.

Example 12 may include the non-transitory computer-readable medium of example 11 and/or some other example herein, wherein the time period may be associated with a number of indicated beacon intervals that are needed in order to transmit the first BSSID profile and the second BSSID profile.

Example 13 may include the non-transitory computer-readable medium of example 11 and/or some other example herein, wherein the first BSSID profile may be included in the first beacon frame and in a third beacon frame, wherein a difference of the first TBTT of the first beacon frame and the second TBTT of the third beacon frame may be based on an integer number associated with the time period.

Example 14 may include the non-transitory computer-readable medium of example 11 and/or some other example herein, wherein the operations further comprise determining the second BSSID profile may be included in a series of beacon frame having a series of target beacon transmission times (TBTT) wherein a difference of consecutive TBTTs may be based on an integer number associated with the time period.

Example 15 may include the non-transitory computer-readable medium of example 10 and/or some other example herein, wherein the operations further comprise: identifying a probe request received from a first station device, wherein the probe request comprises a first known BSSID element comprising an indication of first nontransmitted BSSID profiles known to the first station device; and causing to send a probe response comprising a second known BSSID element that may include second nontransmitted BSSID profiles, which are not indicated in the first known BSSID element.

Example 16 may include the non-transitory computer-readable medium of example 15 and/or some other example herein, wherein the probe response does not include the first nontransmitted BSSID profiles for BSSIDs listed in the first known BSSID of the probe request.

Example 17 may include a method comprising: determining, by one or more processors, one or more collocated access points (APs) comprising a first collocated AP and a second collocated AP, wherein the first collocated AP has a first basic service set identification (BSSID) and first second collocated AP has a second BSSID; determining one or more target beacon transmission times (TBTTs) of beacon frames to be transmitted by the device, wherein the one or more TBTTs are associated with a beacon interval, wherein the device may be a transmitted BSSID access point; determining a first beacon frame comprising a first multiple BSSID element; determining a second beacon frame comprising a second multiple BSSID element; determining a time period associated with a first TBTT of the first beacon frame and a second TBTT of the second beacon frame; causing to schedule the first beacon frame at the first TBTT to be sent to one or more station devices; and causing to schedule the second beacon frame at the second TBTT to be sent to the one or more station devices.

Example 18 may include the method of example 17 and/or some other example herein, wherein the first multiple BSSID element comprises a first BSSID profile associated with the first collocated AP, and wherein the second multiple BSSID element comprises a second BSSID profile associated with the second collocated AP.

Example 19 may include the method of example 18 and/or some other example herein, wherein the time period may be associated with a number of indicated beacon intervals that are needed in order to transmit the first BSSID profile and the second BSSID profile.

Example 20 may include the method of example 18 and/or some other example herein, wherein the first BSSID profile may be included in the first beacon frame and in a third beacon frame, wherein a difference of the first TBTT of the first beacon frame and the second TBTT of the third beacon frame may be based on an integer number associated with the time period.

Example 21 may include the method of example 18 and/or some other example herein, further comprising determining the second BSSID profile may be included in a series of beacon frame having a series of target beacon transmission times (TBTT) wherein a difference of consecutive TBTTs may be based on an integer number associated with the time period.

Example 22 may include the method of example 17 and/or some other example herein, further comprising: identifying a probe request received from a first station device, wherein the probe request comprises a first known BSSID element comprising an indication of first nontransmitted BSSID profiles known to the first station device; and causing to send a probe response comprising a second known BSSID element that may include second nontransmitted BSSID profiles, which are not indicated in the first known BSSID element.

Example 23 may include the method of example 22 and/or some other example herein, wherein the probe response does not include the first nontransmitted BSSID profiles for BSSIDs listed in the first known BSSID of the probe request.

Example 24 may include an apparatus comprising means for: determining one or more collocated access points (APs) comprising a first collocated AP and a second collocated AP, wherein the first collocated AP has a first basic service set identification (BSSID) and first second collocated AP has a second BSSID; determining one or more target beacon transmission times (TBTTs) of beacon frames to be transmitted by the device, wherein the one or more TBTTs are associated with a beacon interval, wherein the device may be a transmitted BSSID access point; determining a first beacon frame comprising a first multiple BSSID element; determining a second beacon frame comprising a second multiple BSSID element; determining a time period associated with a first TBTT of the first beacon frame and a second TBTT of the second beacon frame; causing to schedule the first beacon frame at the first TBTT to be sent to one or more station devices; and causing to schedule the second beacon frame at the second TBTT to be sent to the one or more station devices.

Example 25 may include the apparatus of example 24 and/or some other example herein, wherein the first multiple BSSID element comprises a first BSSID profile associated with the first collocated AP, and wherein the second multiple BSSID element comprises a second BSSID profile associated with the second collocated AP.

Example 26 may include the apparatus of example 25 and/or some other example herein, wherein the time period may be associated with a number of indicated beacon intervals that are needed in order to transmit the first BSSID profile and the second BSSID profile.

Example 27 may include the apparatus of example 25 and/or some other example herein, wherein the first BSSID profile may be included in the first beacon frame and in a third beacon frame, wherein a difference of the first TBTT of the first beacon frame and the second TBTT of the third beacon frame may be based on an integer number associated with the time period.

Example 28 may include the apparatus of example 25 and/or some other example herein, further comprising determining the second BSSID profile may be included in a series of beacon frame having a series of target beacon transmission times (TBTT) wherein a difference of consecutive TBTTs may be based on an integer number associated with the time period.

Example 29 may include the apparatus of example 24 and/or some other example herein, further comprising: identifying a probe request received from a first station device, wherein the probe request comprises a first known BSSID element comprising an indication of first nontransmitted BSSID profiles known to the first station device; and causing to send a probe response comprising a second known BSSID element that may include second nontransmitted BSSID profiles, which are not indicated in the first known BSSID element.

Example 30 may include the apparatus of example 29 and/or some other example herein, wherein the probe response does not include the first nontransmitted BSSID profiles for BSSIDs listed in the first known BSSID of the probe request.

Example 31 may include one or more non-transitory computer-readable media comprising instructions to cause an electronic device, upon execution of the instructions by one or more processors of the electronic device, to perform one or more elements of a method described in or related to any of examples 1-30, or any other method or process described herein Example 32 may include an apparatus comprising logic, modules, and/or circuitry to perform one or more elements of a method described in or related to any of examples 1-30, or any other method or process described herein.

Example 33 may include a method, technique, or process as described in or related to any of examples 1-30, or portions or parts thereof.

Example 34 may include an apparatus comprising: one or more processors and one or more computer readable media comprising instructions that, when executed by the one or more processors, cause the one or more processors to perform the method, techniques, or process as described in or related to any of examples 1-30, or portions thereof.

Example 35 may include a method of communicating in a wireless network as shown and described herein.

Example 36 may include a system for providing wireless communication as shown and described herein.

Example 37 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
    determine one or more collocated access points (APs) comprising a first collocated AP and a second collocated AP, wherein the first collocated AP has a first basic service set identification (BSSID) and first second collocated AP has a second BSSID;
    determine one or more target beacon transmission times (TBTTs) of beacon frames to be transmitted by the device, wherein the one or more TBTTs are associated with a beacon interval, wherein the device is a transmitted BSSID access point;
    determine a first beacon frame comprising a first multiple BSSID element; determine a second beacon frame comprising a second multiple BSSID element, wherein the first multiple BSSID element comprises a first BSSID profile associated with the first collocated AP, and wherein the second multiple BSSID element comprises a second BSSID profile associated with the second collocated AP;
    determine a time period associated with a first TBTT of the first beacon frame and a second TBTT of the second beacon frame, wherein the time period includes a number of indicated beacon intervals that are needed in order to transmit the first BSSID profile and the second BSSID profile;
    cause to schedule the first beacon frame at the first TBTT to be sent to one or more station devices;
    cause to schedule the second beacon frame at the second TBTT to be sent to the one or more station devices;
    identify a probe request received from a first station device, wherein the probe request comprises a first known BSSID element comprising an indication of first nontransmitted BSSID profiles known to the first station device; and
    cause to send a probe response comprising a second known BSSID element that includes a second nontransmitted BSSID profiles which are not indicated in the first known BSSID element.

2. The device of claim 1, wherein the first BSSID profile is included in the first beacon frame and in a third beacon frame, wherein a difference of the first TBTT of the first beacon frame and the second TBTT of the third beacon frame is based on an integer number associated with the time period.

3. The device of claim 1, wherein the processing circuitry is further configured to determine the second BSSID profile is included in a series of beacon frame having a series of target beacon transmission times (TBTT) wherein a difference of consecutive TBTTs is based on an integer number associated with the time period.

4. The device of claim 1, wherein the probe response does not include the first nontransmitted BSSID profiles for BSSIDs listed in the first known BSSID of the probe request.

5. The device of claim 1, further comprising a transceiver configured to transmit and receive wireless signals.

6. The device of claim 5, further comprising an antenna coupled to the transceiver to cause to send the first beacon frame.

7. A non-transitory computer-readable medium storing computer- executable instructions which when executed by one or more processors result in performing operations comprising:
    determining one or more collocated access points (APs) comprising a first collocated AP and a second collocated AP, wherein the first collocated AP has a first basic service set identification (BSSID) and first second collocated AP has a second BSSID;
    determining one or more target beacon transmission times (TBTTs) of beacon frames to be transmitted by the device, wherein the one or more TBTTs are associated with a beacon interval, wherein the device is a transmitted BSSID access point;
    determining a second beacon frame comprising a second multiple BSSID element, wherein the first multiple BSSID element comprises a first BSSID profile associated with the first collocated AP, and wherein the second multiple BSSID element comprises a second BSSID profile associated with the second collocated AP;
    determining a time period associated with a first TBTT of the first beacon frame and a second TBTT of the second beacon frame, wherein the time period includes a number of indicated beacon intervals that are needed in order to transmit the first BSSID profile and the second BSSID profile; causing to schedule the first beacon frame at the first TBTT to be sent to one or more station devices; causing to schedule the second beacon frame at the second TBTT to be sent to the one or more station devices;
    identifying a probe request received from a first station device, wherein the probe request comprises a first known BSSID element comprising an indication of first nontransmitted BSSID profiles known to the first station device; and causing to send a probe response comprising a second known BSSID element that includes a second nontransmitted BSSID profiles which are not indicated in the first known BSSID element.

8. The non-transitory computer-readable medium of claim 7, wherein the first BSSID profile is included in the first beacon frame and in a third beacon frame, wherein a difference of the first TBTT of the first beacon frame and the second TBTT of the third beacon frame is based on an integer number associated with the time period.

9. The non-transitory computer-readable medium of claim 7, wherein the operations further comprise determining the second BSSID profile is included in a series of beacon frame having a series of target beacon transmission times (TBTT)

wherein a difference of consecutive TBTTs is based on an integer number associated with the time period.

10. The non-transitory computer-readable medium of claim 7, wherein the probe response does not include the first nontransmitted BSSID profiles for BSSIDs listed in the first known BSSID of the probe request.

11. A method comprising: determining, by one or more processors, one or more collocated access points (APs) comprising a first collocated AP and a second collocated AP, wherein the first collocated AP has a first basic service set identification (BSSID) and first second collocated AP has a second BSSID;
   determining one or more target beacon transmission times (TBTTs) of beacon frames to be transmitted by the device, wherein the one or more TBTTs are associated with a beacon interval, wherein the device is a transmitted BSSID access point; determining a second beacon frame comprising a second multiple BSSID element, wherein the first multiple BSSID element comprises a first BSSID profile associated with the first collocated AP, and wherein the second multiple BSSID element comprises a second BSSID profile associated with the second collocated AP;
   determining a time period associated with a first TBTT of the first beacon frame and a second TBTT of the second beacon frame, wherein the time period includes a number of indicated beacon intervals that are needed in order to transmit the first BSSID profile and the second BSSID profile; causing to schedule the first beacon frame at the first TBTT to be sent to one or more station devices; causing to schedule the second beacon frame at the second TBTT to be sent to the one or more station devices;
   identifying a probe request received from a first station device, wherein the probe request comprises a first known BSSID element comprising an indication of first nontransmitted BSSID profiles known to the first station device; and
   causing to send a probe response comprising a second known BSSID element that includes a second nontransmitted BSSID profiles which are not indicated in the first known BSSID element.

12. The method of claim 11, wherein the first BSSID profile is included in the first beacon frame and in a third beacon frame, wherein a difference of the first TBTT of the first beacon frame and the second TBTT of the third beacon frame is based on an integer number associated with the time period.

* * * * *